United States Patent
Bao et al.

(10) Patent No.: US 6,449,047 B1
(45) Date of Patent: *Sep. 10, 2002

(54) CALIBRATED SWEPT-WAVELENGTH LASER AND INTERROGATOR SYSTEM FOR TESTING WAVELENGTH-DIVISION MULTIPLEXING SYSTEM

(75) Inventors: Yufei Bao, Norcross; David Daugherty, Lawrenceville; Kevin Hsu, Roswell, all of GA (US); Tom Q. Y. Li, Cupertino, CA (US); Calvin M. Miller, Naples, FL (US); Jeff W. Miller, Kennesaw, GA (US)

(73) Assignee: Micron Optics, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/439,192

(22) Filed: Nov. 12, 1999

Related U.S. Application Data

(60) Provisional application No. 60/108,213, filed on Nov. 13, 1998.

(51) Int. Cl.[7] .................................................. G01B 9/02
(52) U.S. Cl. ....................................... 356/478; 356/480
(58) Field of Search ................................ 356/477, 478, 356/480, 73.1; 250/227.19, 227.27; 385/12

(56) References Cited

U.S. PATENT DOCUMENTS

| | | |
|---|---|---|
| 5,212,745 A | 5/1993 | Miller |
| 5,212,746 A | 5/1993 | Miller et al. |
| 5,289,552 A | 2/1994 | Miller et al. |
| 5,375,181 A | 12/1994 | Miller et al. |
| 5,422,970 A | 6/1995 | Miller et al. |
| 5,509,093 A | 4/1996 | Miller et al. |
| 5,563,973 A | 10/1996 | Miller et al. |
| 5,838,437 A | 11/1998 | Miller et al. |
| 5,892,582 A | 4/1999 | Bao et al. |
| 5,896,193 A | 4/1999 | Colbourne et al. |
| 6,097,487 A | * 8/2000 | Kringlebotn et al. ....... 356/478 |
| 6,115,122 A | 9/2000 | Bao et al. |

OTHER PUBLICATIONS

Nyman, B., (1998) Optoelectronics World, Sep., pp. 527–532.

Yun et al., (1998) Optics Letters 23(11):843–845.

* cited by examiner

*Primary Examiner*—Samuel A. Turner
(74) *Attorney, Agent, or Firm*—Greenlee, Winner and Sullivan, P.C.

(57) ABSTRACT

Swept-wavelength lasers with accurately calibrated wavelength output which can be very rapidly scanned or swept over a selected wavelength band. The invention provides lasers that generate wavelengths in the 1550 nm range that can be swept over about 50 nm. These swept-wavelength lasers are generally useful as accurately calibrated high power light sources. Calibration is achieved by use of a calibrated reference system. Swept-wavelength lasers are particularly useful as components of sensor interrogator systems which determine wavelengths reflected (or transmitted) by Fiber Bragg Gratings (FBG) in sensor arrays. Swept wavelength lasers of this invention are also generally useful for testing of WDM systems, particularly for their applications to current communication systems. the invention provides lasers, interrogator systems and systems for testing WDM components employing the lasers as a calibrated light source. The invention also provides methods for calibrating a swept-wavelength laser using the wavelength reference system provided herein as well as methods for detecting wavelengths in an optical signal or output using the interrogator systems provided herein. The invention further provides methods for testing the performance of WDM components using the testing systems provided herein.

20 Claims, 9 Drawing Sheets

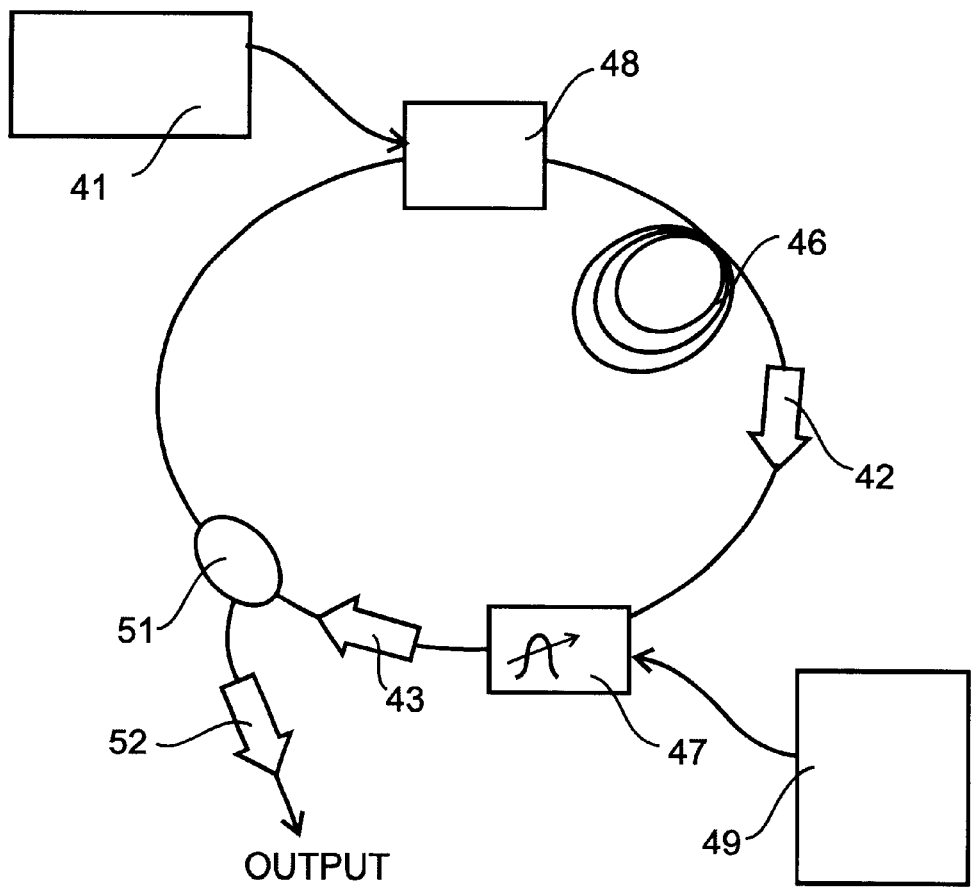
FIG. 3A - PRIOR ART
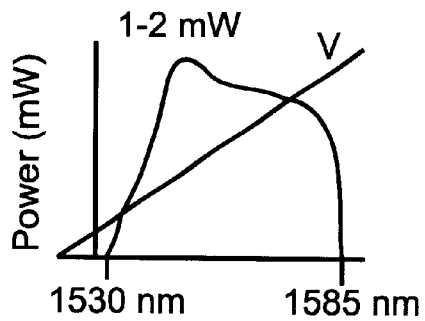
FIG. 3B - PRIOR ART

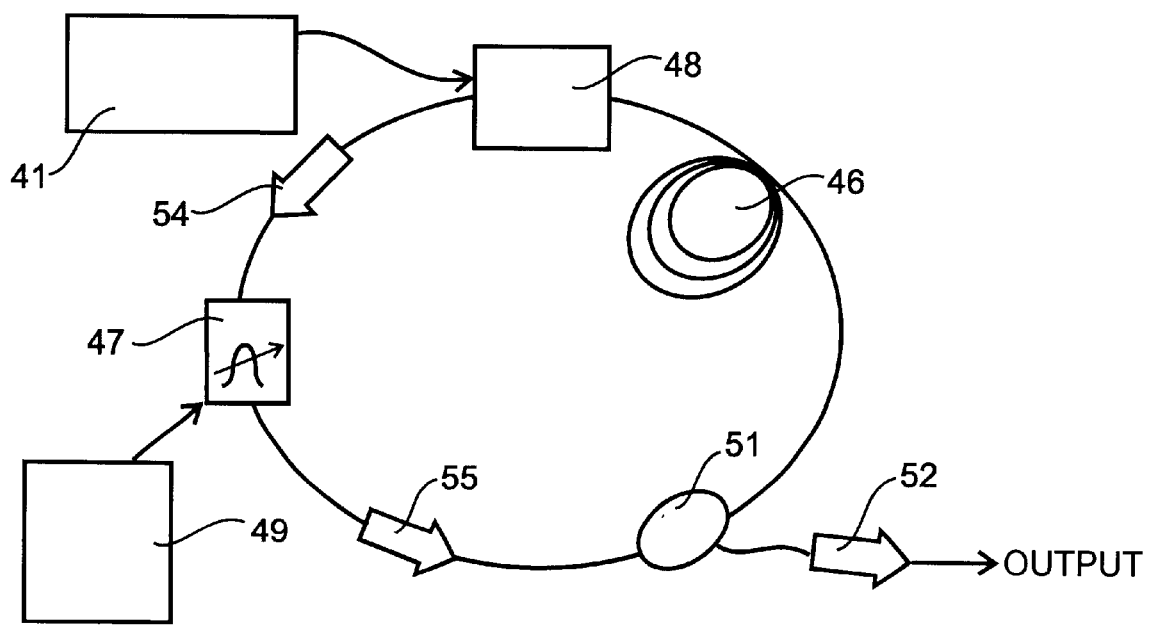
FIG. 3C - PRIOR ART

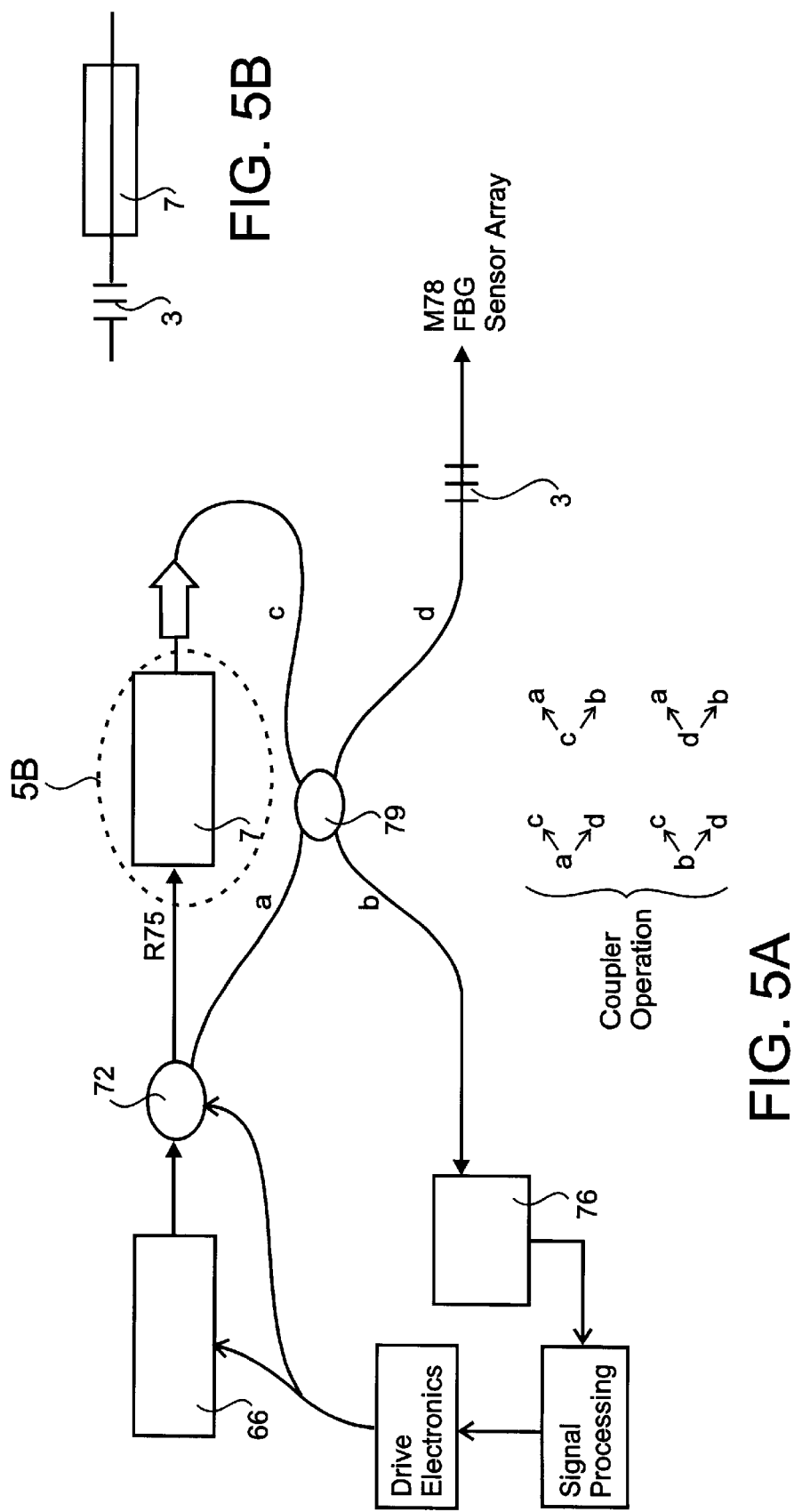

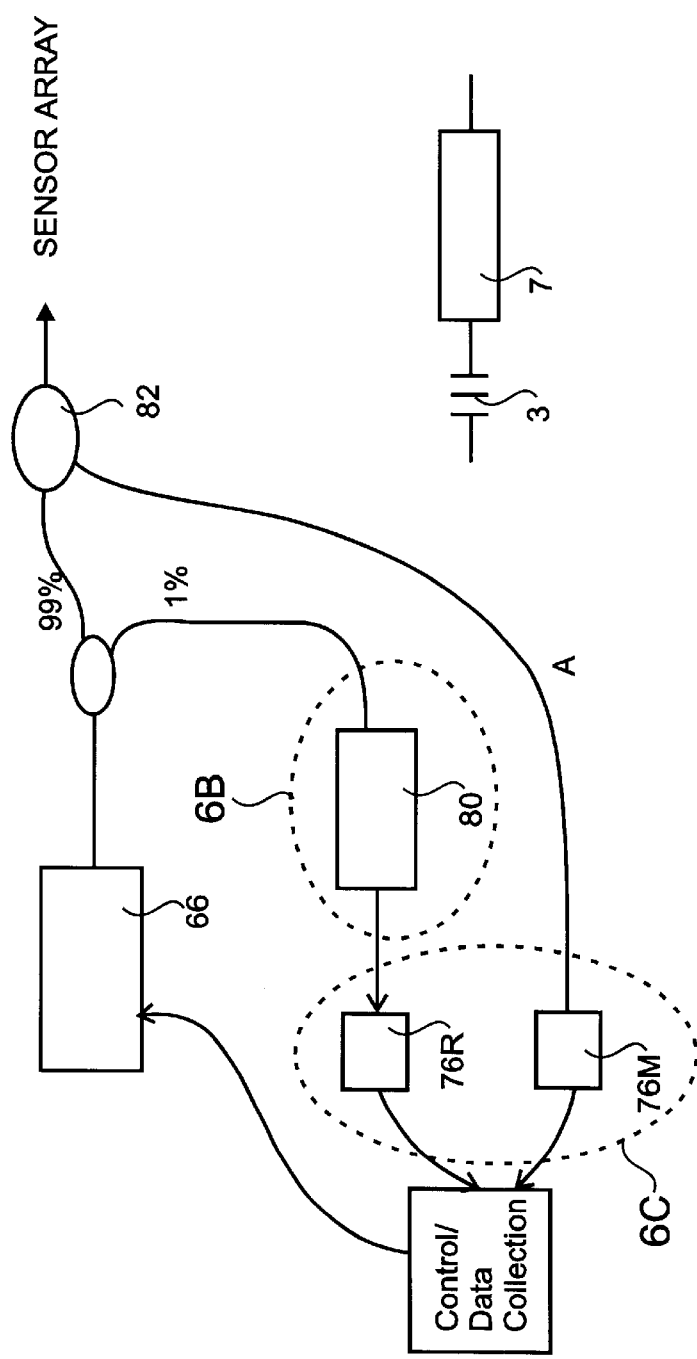

CALIBRATED SWEPT-WAVELENGTH LASER AND INTERROGATOR SYSTEM FOR TESTING WAVELENGTH-DIVISION MULTIPLEXING SYSTEM

CROSS-REFERENCE TO RELATED APPLICATIONS

This application takes priority under 35 U.S.C. §119(e) from U.S. provisional application serial No. 60/108,213, filed Nov. 13, 1998, which is incorporated in its entirety herein to the extent that it is not inconsistent with the disclosure herein.

BACKGROUND OF THE INVENTION

Swept wavelength lasers and wavelength interrogator systems employing such lasers are useful in a variety of communication and sensing applications.

Wavelength-division multiplexing (WDM) has greatly expanded the number of channels that can be carried on fiber optic systems. Swept wavelength laser systems capable of measuring and characterizing component channels spaced as narrowly as 50 GHz are desirable in current communication applications. WDM systems require wavelength and amplitude measurement techniques in both transmission and isolation paths. Preferred techniques provide rapid measurement over the large number of channels employed. A WDM component test system based on the use of a swept wavelength laser has been reported. (B. Nyman [1998] *Optoelectronics World*, September, pp. 527–532.)

Fiber optic sensor arrays incorporating fiber Bragg gratings are employed in a variety of engineering and environmental sensing applications. The wavelength reflected by a fiber Bragg grating is affected by environmental perturbations (e.g., strain, temperature) so that changes in the wavelengths of FBGs in an array can be used to detect these perturbations. FBG sensor arrays require wavelength interrogator systems to measure small changes in wavelength, preferably for large numbers of individual FBGs. Rapid wavelength detection is also preferred. S. H. Yun et al. (1998) *Optics Letters* 23(11):843–845, reports the use of a tunable swept wavelength laser interrogator system for use with FBG sensor arrays.

Swept wavelength laser systems and wavelength interrogators employing these lasers that have been described do not provide for wavelength calibration over the entire wavelength range to be scanned.

SUMMARY OF THE INVENTION

This invention provides swept-wavelength lasers with accurately calibrated wavelength output which can be very rapidly scanned or swept over a selected wavelength band. In particular, the invention provides lasers that generate wavelengths in the 1550 nm range that can be swept over about 50 nm. These swept-wavelength lasers are generally useful as accurately calibrated high power light sources. Calibration is achieved by use of a calibrated reference system. Swept-wavelength lasers are particularly useful as components of sensor interrogator systems which determine wavelengths reflected (or transmitted) by Fiber Bragg Gratings (FBG). Swept wavelength lasers of this invention are also generally useful for testing of WDM systems, particularly for their applications to current communication systems. This invention provides a method of calibrating a swept-wavelength laser using the reference system provided herein. Additional systems provided include various interrogators for sensor arrays and systems for testing the performance of WDM system components as well as methods of measuring wavelength(s) transmitted by an optical device and methods for testing the performance of WDM components.

The reference system employed herein for calibrating the swept-wavelength laser and which is employed as a component in sensor interrogation devices has been described in U.S. Pat. Nos. 5,838,437, 5,892,582 and co-pending U.S. patent application Ser. No. 09/286,411, filed Apr. 5, 1999, which are incorporated in their entirely by reference herein to the extent not inconsistent with the disclosure herein. The reference system employs fixed fiber Fabry-Perot filters which generate a comb of wavelengths and a reference FBG ($FBG_R$) which reflects a known wavelength or transmits output having a notch at a known wavelength. FBG's are well-known devices and their use in this wavelength reference has been described in the U.S. patent applications listed above. Fixed cavity length FFP filters have been described in the following U.S. patents all of which are incorporated by reference herein for their description of the construction and operation of such filters: U.S. Pat. Nos. 5,212,745; 5,212,746; 5,289,552; 5,375,181; 5,422,970; 5,509,093; and 5,563,973. All-fiber FFPs constructed in fiber ferrule assemblies are preferred for use in the lasers of this invention.

The swept-wavelength lasers of this invention are illustrated as employing tunable fiber Fabry-Perot filters (FFP-TF). These filters can be constructed to have high finesse and can be rapidly scanned or swept by changing the cavity length, for example, using piezoelectric transducers (PZTs). All-fiber FFP-TF's constructed in fiber ferrule assemblies and having alignment fixtures that allow rapid tuning of cavity length without significant losses due to fiber misalignment are preferred. The construction and operation of FFP-TF are also described in U.S. Pat. Nos. 5,212,745; 5,212,746; 5,289,552; 5,375,181; 5,422,970; 5,509,093; and 5,563,973.

BRIEF DESCRIPTION OF THE DRAWINGS

FIG. 3A is a schematic drawing of a swept wavelength laser configuration.

FIG. 3B is an illustrative graph of the output of a swept wavelength laser of FIG. 3A as a function of a voltage ramp (V) applied to the tunable FFP of the laser.

FIG. 3C is a schematic drawing of another swept wavelength laser configuration of this invention.

FIG. 5A is a wavelength interrogator system of this invention illustrated for use in interrogation of an FBG sensor array. The operation of the coupler for transmission among paths a, b, c, and d is illustrated in a chart.

FIG. 5B is an enlarged schematic view of a wavelength reference with FBG and FFPI in series that can be employed in the interrogator system of FIG. 5A in place of the FFPI and reference FBG coupled in parallel illustrated.

FIGS. 6A–C schematically illustrate another wavelength interrogator system of this invention employing a circulator and illustrated for interrogation of an FBG sensor array.

FIG. 6B is an enlarge view of a wavelength reference that can be employed in the interrogator.

FIG. 6C is an alternative photodetection system for use in the interrogator in which the two photodetectors of the system of FIG. 6A are replaced with a single detector and an optical switch.

DETAILED DESCRIPTION OF THE INVENTION

The invention is further described by reference to the following drawings in which like numbers represent like features.

Figure 1:
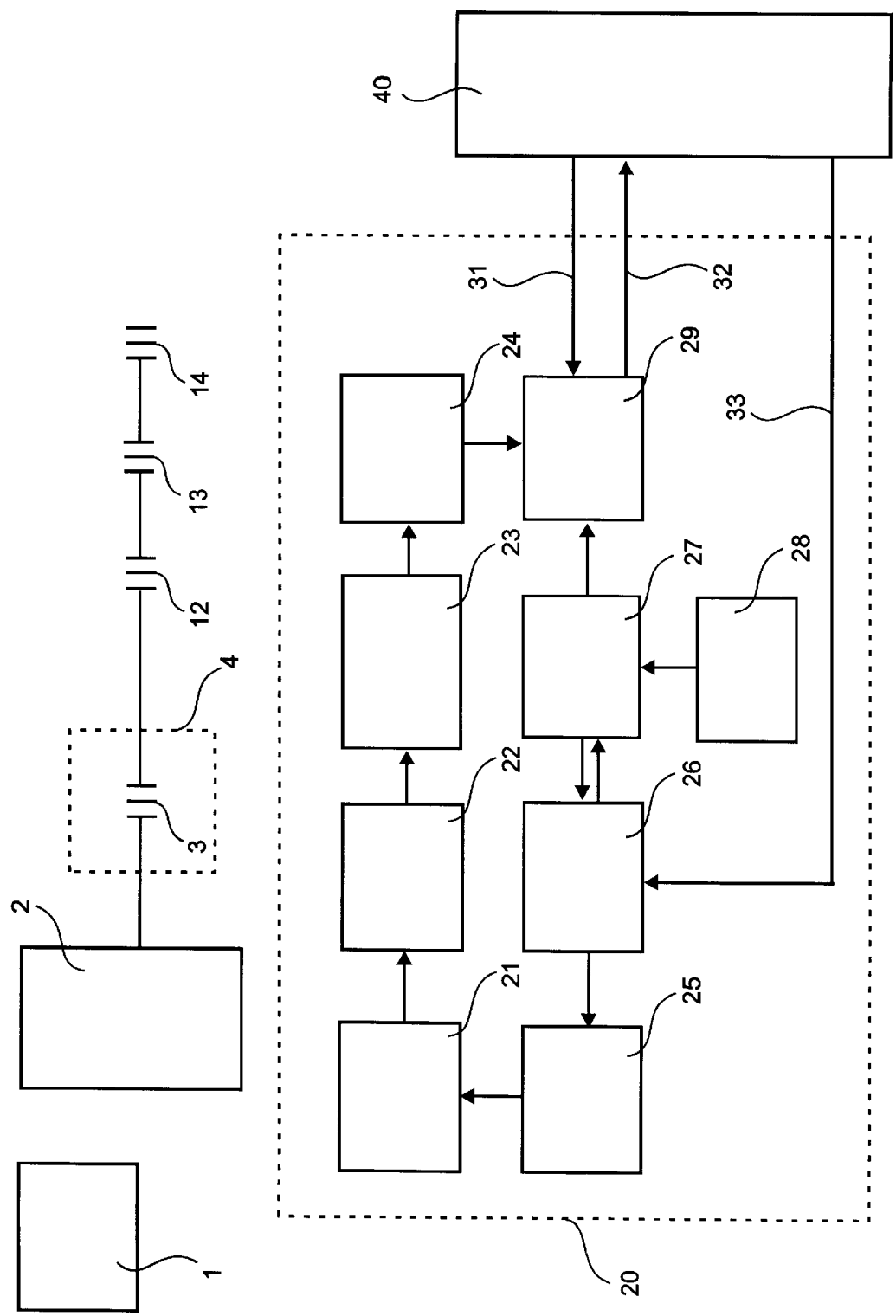
FIG. 1 is a schematic drawing of an wavelength interrogator system from U.S. Pat. No. 5,838,437

FIG. 1 is a block diagram of an exemplary interrogator system taken from U.S. Pat. No. 5,838,437. A light source 1 is optically coupled (optical coupling is indicated by heavy lines in the block diagrams) through a 1×2 splitter 2 to a reference fiber Bragg grating (FBG) 3, optionally housed in a controlled temperature environment 4, and to unknown wavelength FBGs 12, 13 and 14. Splitter 2 is also optically coupled to scanner 20 comprising tunable fiber Perot filter (FFP-TF) 21, photodetector 22, differentiator 23, zero-crossing detector 24, piezoelectric transducer (PZT) 25, sweep generator 26, counter 27, clock 28 and data latch 29. Splitter 2 is optically coupled through tunable fiber Perot filter (FFP-TF) 21 to photodetector 22. Photodetector 22 is electrically coupled through differentiator 23 and zero-crossing detector 24 to data latch 29. Clock 28 is electrically coupled to counter 27 which is in turn electrically coupled through sweep generator 26 to PZT 25. PZT 25 is mechanically coupled to FFP-TF 21. Sweep generator 26 and data latch 29 are electrically coupled to computer 40.

In operation, broad spectrum light from light source 1 is coupled through splitter 2 and illuminates FBGs 3, 12, 13 and 14. Light at the specific wavelengths of each of the FBGs is reflected back through splitter 2 and a portion of the reflected light is coupled to FFP-TF 21. Light at the wavelength to which FFP-TF 21 is tuned is passed through to detector 22. Electronic clock 28 supplies a pulse train to operate counter 27 which generates a numeric value n that is proportional to time. The numeric value n in counter 27 is passed to sweep generator 26 which provides to PZT 25 a sweep signal proportional to n. PZT 25 then produces a mechanical motion, in response to the sweep signal, which tunes FFP-TF (by changing the FFP cavity length) to wavelengths related, approximately linearly, to the numeric values n in counter 27. Counter 27 supplies its numeric values also to data latch 29. In typical operation, counter 27 is reset and then counts pulses from clock 28 in a linear fashion with respect to time. Sweep generator 26 generates a linear sweep voltage ramp v from the numeric values n supplied by counter 27 and applies it to PZT 25 which in turn applies an approximately linear motion to FFP-TF 21. As FFP-TF 21 sweeps across the wavelength spectrum, the light reflected by each of the FBGs appears at the input to photodetector 22 at a particular time t and a particular numeric value n. Photodetector 22 produces an electrical signal h which is proportional to the intensity of the light striking it. Differentiator 23 produces a signal dh/dt (or dh/dn) which has a zero-crossing at each wavelength λ where an FBG produces a maximum reflection. The signal dh/dt is supplied to zero-crossing detector 24 which produces a zero-crossing signal coincident with the zero-crossing of dh/dt. The zero-crossing signal is applied to data latch 29 which captures the value of n when each zero crossing occurs. Computer 40 asynchronously interrogates data latch 29 via latch control lines 31 and receives the stored values of n where the zero crossings occurred over data lines 32. Computer 40 also provides control signals and quiescent bias data to sweep generator 26, and in turn to counter 27, via sweep control lines 33.

By the process just described, a relationship, between the counter values n and the wavelengths λ at which peak reflections from fiber Bragg gratings (FBGs) occur, can be obtained.

The FBG interrogator of FIG. 1 can operate at 1520 nm to 1570 mn (the main telecommunications window where most FBGs are used) with very high resolution (1 µstrain) for short-term mechanical sensing. A standard pigtailed LED can provide sufficient broadband power to illuminate up to 32 gratings (FBGs) and a sensitive zero crossing detector can detect wavelength shifts of a few tenths of a picometer over a 50 nm wavelength window. However, wavelength drifts which were many times greater than the sub-µstrain resolution were observed in this high wavelength resolution system, demonstrating the need for high accuracy wavelength references. The difficulty lies in the calibration of the instrument with sufficient accuracy to measure the very small changes in wavelengths produced by changes in the strain on a fiber or to make measurements of wavelengths to very tight tolerances.

In the system of FIG. 1, the single reference FBG provides only one point of reference in a plot of h versus n. FFP-TFs and PZTs are not perfectly linear and therefore a means of providing multiple reference points over the wavelength spectrum of interest is necessary to ensure accuracy across the spectrum. An object of the invention is to provide a reference system with multiple calibrated reference points across a wavelength spectrum for accurate calibration of interrogation systems such as that of FIG. 1.

Figure 2:
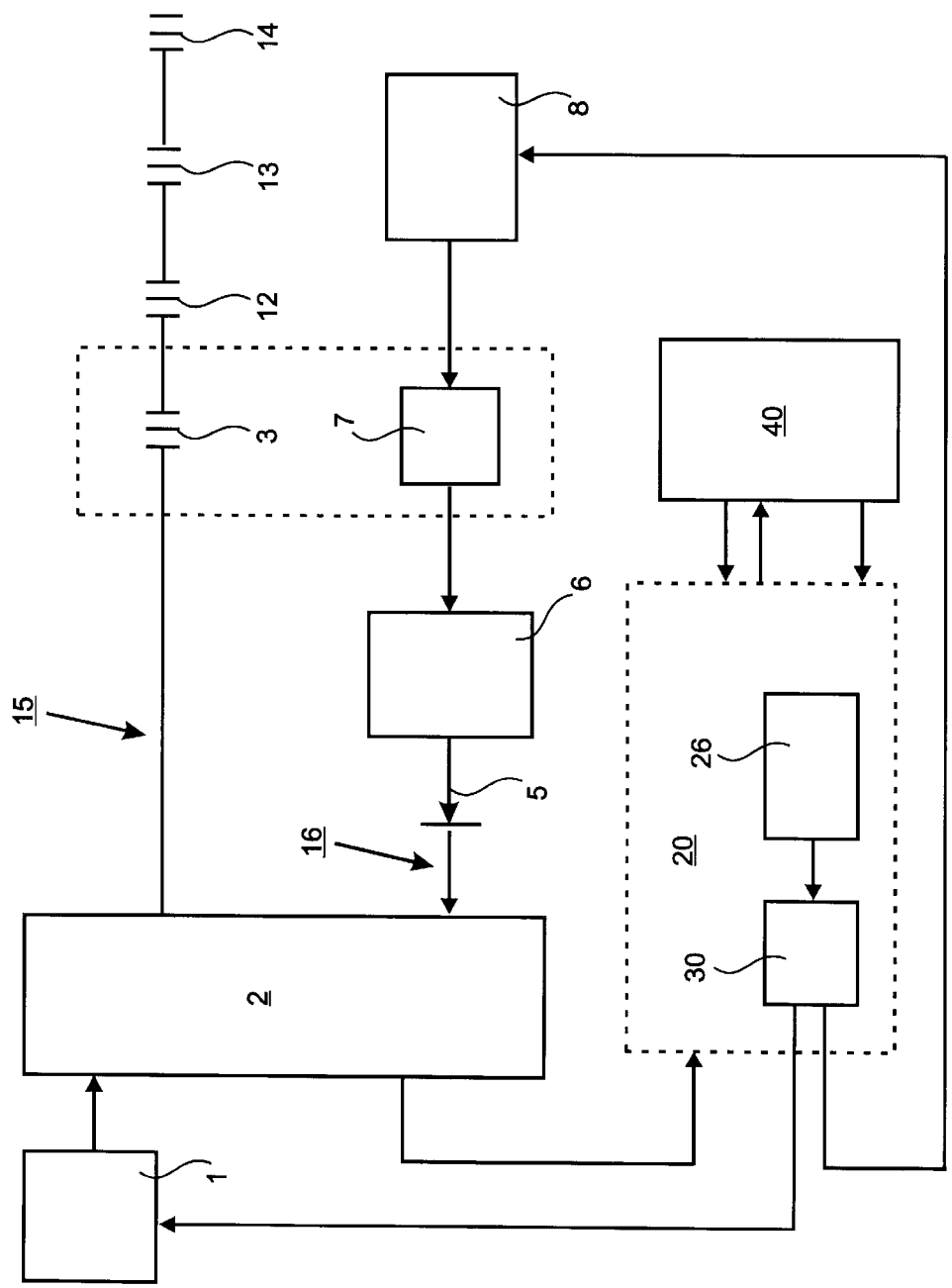
FIG. 2 is a schematic drawing of another wavelength interrogator system from U.S. Pat. No. 5,838,437.

FIG. 2 illustrates another interrogator system of U.S. Pat. No. 5,838,437. FIG. 2 is a block diagram of a reflective FBG sensor system. A subject light source 1 is optically coupled through splitter 2 to a reference fiber Bragg grating (FBG) 3, optionally housed in a controlled temperature environment 4 to provide for temperature stabilization, and to a plurality of FBGs of unknown wavelength (e.g., an arbitrary number of sensor FBGs) depicted here by the three FBGs 12, 13 and 14. A reference light source 8 is optically coupled through a fixed FFP filter 7 (which is optionally housed in controlled temperature environment to provide temperature stabilization), a bandpass filter 6, and an optical isolator 5 to splitter 2. In a preferred configuration, as shown in the figure, the fixed FFP filter is housed in the same temperature controlled environment as the reference FBG 3. Splitter 2 is also optically coupled to scanner 20 which is electrically coupled to computer 40. Scanner 20 now includes a light source control 30 connected to sweep generator 26. Light source control 30 is electrically coupled to subject light source 1 and to reference light source 8.

The system of FIG. 2 comprises an optical path 19 with two branches: measurement branch 15 and reference branch 16. The measurement branch 15 couples the devices whose wavelength is to be determined, in this case FBGs 12, 13 and 14, through splitter 2 to scanner 20. Reference branch 16 couples fixed FFP filter 7 (the precision reference), along with its supporting components, through splitter 2 to scanner 20.

In operation, only subject light source 1 or reference light source 8 can be on at one time. Sources 1 and 8 are switched on and off by light source control 30 in response to signals from sweep generator 26. When source 1 is on, the system functions as described previously for FIG. 1. During the time that source 1 is on, the scanner sweeps across the wavelength spectrum and the counter values n, corresponding to the wavelength $\lambda$ for the reflection peak of each of the FBGs, are captured by data latch 29. When reference light source 8 is on, broad spectrum light from source 8 is coupled into fixed FFP filter 7 which transmits maximum light only at specific and precisely separated wavelengths. Light from filter 7 passes through bandpass filter 6 which passes light only within a wavelength spectrum of interest. Light from BPF 6 then passes through optical isolator 5 (which blocks reflected light from reentering FFP filter 7) and splitter 2 to scanner 20. While reference source 8 is on, the scanner again sweeps across the wavelength spectrum and this time the counter values n, corresponding to the wavelengths $\lambda$ for each of the transmission peaks of fixed FFP filter 7, are captured by data latch 29. The zero crossing from FBG 3 is used to identify a particular zero crossing from the FFP filter 7, and data latch 29 stores a value of n for every filter 7 zero crossing thereafter, computer 40 can retrieve the data from latch 29 and count zero crossings of filter 7, from the one identified to an unknown FBG zero crossing. The computer can then interpolate between two zero crossings associated with comb wavelengths, one on each side of the unknown, to determine precisely the wavelength of the unknown. More details of operation of this interrogator system are provided in U.S. Pat. No. 5,838,437.

Although the precise relationship between any counter value n and a corresponding wavelength $\lambda$ of the tunable FFP filter 21 (FIG. 1) cannot be accurately predicted, the use of a fixed FFP filter 7 to produce a comb of precisely located and separated references, and a reference FBG 3 to identify one tooth of the comb as a known reference, allows accurate measurements by interpolation to compute the location of an unknown peak between two teeth of the comb (or coinciding with a comb peak).

The reference system of this invention combines an FFPI (Fiber Fabry-Perot Interferometer or fixed FFP filter), which produces a number of very accurately spaced wavelengths (hereinafter referred to as a comb), with an FBG which produces a reference wavelength (as a peak or a notch in a spectrum) for use in identifying the wavelength of a peak produced by the FFPI (identification of one peak allows identification of all peaks in the comb).

FIGS. 3A and B illustrate swept-wavelength lasers useful as swept-wavelength sources in the devices and system configurations of this invention.

FIG. 3A is similar to the fiber laser described in Yun et al. (1998) supra. Pump wavelength (typically 980 nm in configuration herein and 1470 nm in the Yun et al. reference) is introduced through WDM coupler (48) into the fiber ring from pump laser 41, traveling in a clockwise direction determined by isolators (42, 43) positioned in the ring, passing through the active fiber (46) (EDF, erbium-doped fiber 10 mm long) and through the tunable FFP filter (47). Laser output is tuned by changing the filter cavity length over about 50 nm in the 1550 nm range (e.g., about 1530 nm to about 1585 nm). The FFP-TF is scanned or swept by application of a voltage ramp to a PZT transducer which changes the cavity length in the filter from sweep generator (49). Laser output is schematically illustrated in FIG. 3B as a function of ramp voltage (V), where laser output powers in the range of about 1 to 2 mW can be obtained. Laser output exits at a 50:50 coupler (51) and the output connection is optionally provided with an isolator (52).

In general, higher finesse FFP-TF's (finesse greater than about 500) are preferred for use in the swept wavelength lasers of this invention. Lasers employing an FFP-TF with a finesse of 700 or a finesse of 2000 were constructed. The laser employing the higher finesse filter for sweeping the wavelength was preferred in that it had higher output power and narrower linewidth, giving higher resolution. It was also found that signal to noise was lower in lasers employing lower finesse filters. It is believed that the use of higher finesse FFP-TF's avoids mode locking of the laser that was reported by Yun et al. supra.

FIG. 3C is a reversely pumped fiber laser having similar components to the laser of FIG. 3A. Pump laser (41) is introduced into the fiber ring traveling counterclockwise as determined by isolators (54, 55) in the ring, passing through the FFP-TF (47) and the active fiber (46).

The lasers of FIGS. 3A and C can also optionally include polarization compensation and other components as described in Yun et al. supra.

Either laser configuration as illustrated in FIGS. 3A or 3C can be used in the calibrated swept wavelength lasers of this invention and in the interrogator and testing systems herein.

Figure 4A:
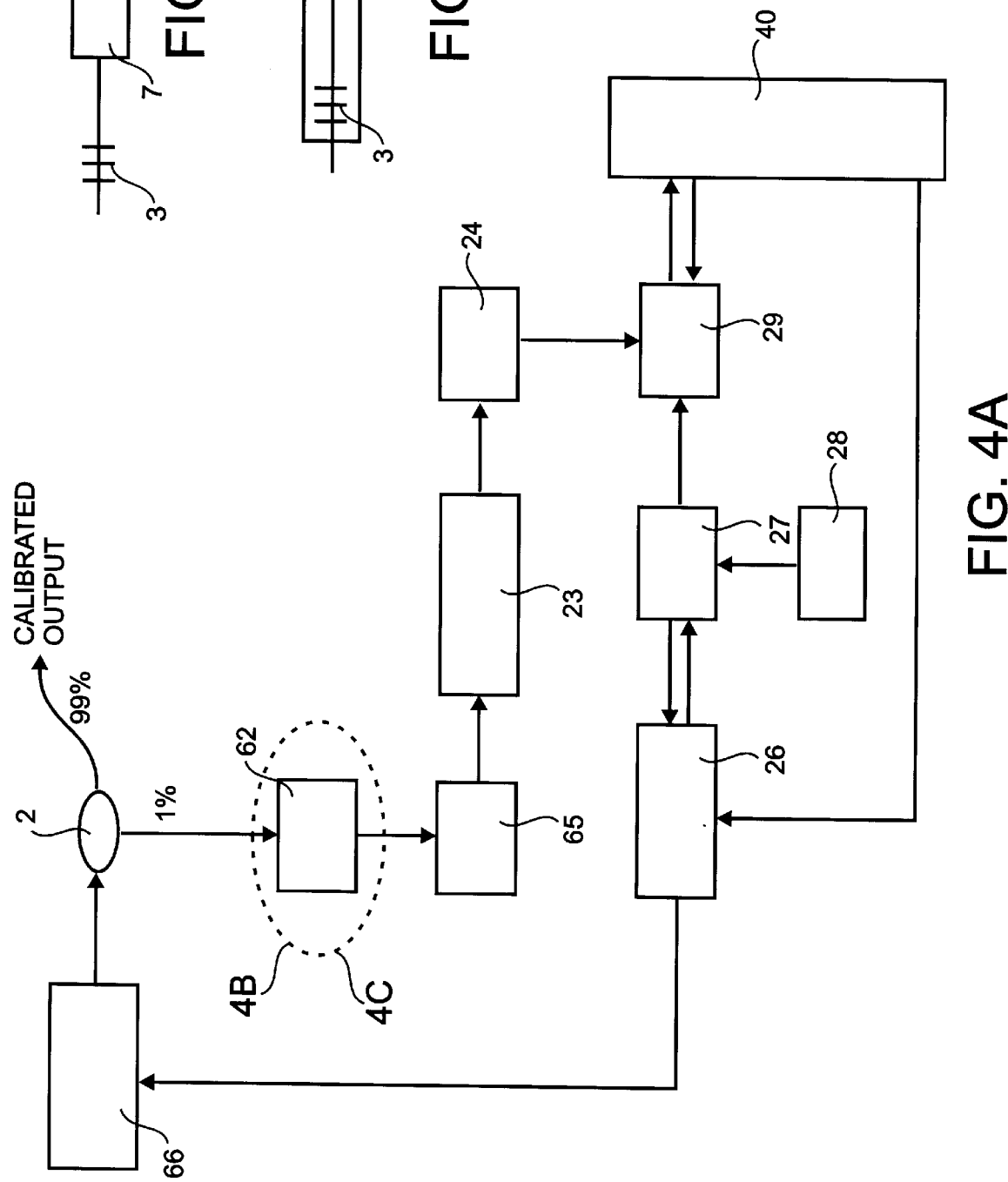
FIG. 4A is a schematic drawing of a calibrated swept wavelength laser of this invention employing a multi-wavelength reference.

FIG. 4A is a schematic drawing illustrating a calibrated swept-wavelength laser of this invention. A swept-wavelength source as illustrated, for example, in FIGS. 3A and 3C, is wavelength calibrated by splitting off a portion of the swept-wavelength output into a reference branch such that the swept output passes through a wavelength reference (62). The wavelength reference is illustrated as an FFPI in series with an FBGR (FIGS. 4B or 4C) which reflects a known reference wavelength sufficiently close in wavelength to a peak of the FFPI comb to allow the wavelength of that peak to be identified. The combination will transmit a comb of wavelengths in which one of the comb peaks is marked and/or identified. Output light that is transmitted through the wavelength reference is detected, for example, by a photodetector (65). Only wavelengths corresponding to those in the comb are transmitted. The wavelengths of the comb are themselves calibrated prior to use in the wavelength reference, for example, by generating reflections from an array of FBGs of known reflection wavelength and calibrating the reference system with these known wavelengths. FBGs having known reflected wavelength are commercially available or FBGs can be calibrated using calibrated known standard light sources. However, any known wavelength standards may be employed to calibrate the wavelength reference. Wavelength interrogation of the reference output is preferably performed using a zero-crossing detection method as described in U.S. Pat. No. 5,838,437 or 5,892,582 and as discussed above in the descriptions of FIGS. 1 and 2. Other methods known in the art for wavelength detection and comparison can be employed.

As the wavelength of the swept-wavelength laser is varied by application of a voltage ramp from a sweep generator (26), the wavelength at which peaks (or notches) in the detector output occur are logged by the electronics of the system. An electronic clock (28) supplies a pulse train to operate a counter (27) which generates a numeric value n that is proportional to time. The numeric value n in the counter is passed to the sweep generator which then provides a sweep signal to the PZT of the FFP-TF of the swept-wavelength source (66) proportional to n. The PZT of the source produces a mechanical motion in response to the sweep signal that changes the FFP cavity length of the laser to sweep the wavelength band of the laser. Wavelengths in the sweep are approximately linearly related to the numeric values of n in the counter. In typical operation, the counter counts pulses from the clock in a linear fashion with respect to time. The sweep generator generates a linear sweep voltage ramp V based on values supplied by the counter and applies the ramp to sweep wavelength in the source. As the source is swept, a portion of the output is diverted into the reference branch and peaks of light are detected at the wavelengths matching those of the calibrated comb peaks of the wavelength reference. Intensity of light at the detector as a function of time (during the sweep or count) is measured. Peak intensity is related to n and to voltage applied to the PZT. The electrical signal from the detector is passed to a differentiator (23) which produces a signal dh/dT (or dH/dn) which has a zero-crossing at each wavelength where the calibrated reference comb has a peak maxim. The differentiated signal is passed to a zero-crossing detector (24) which produces an electronic signal coincident with a zero-crossing of dh/dt. This signal is passed to the data latch (29) which captures the n value of each zero crossing. This process relates an n value to a reference wavelength peak and to a voltage of the voltage ramp and calibrates the wavelength sweep. The use of the multiple wavelength reference in combination with the swept-wavelength laser allows continuous calibration of the wavelength of the laser. The calibration achieved using this multiple wavelength reference is highly accurate over the entire wavelength sweep and can account for nonlinearity in wavelength tuning. Stored values of n associated with reference wavelength peaks (i.e., zero-crossings) can be passed to a computer (40) which can also provide control signals to control and coordinate the sweep generator, the counter and data collection (e.g., to start, stop and control the speed of the sweep, coordinate data collection with the sweep, etc.). Details of the zero-crossing method for wavelength interrogation and its application to interrogation of sensor arrays are provided in U.S. Pat. No. 5,838,437. Details of the use of the wavelength reference are provided in U.S. Pat. No. 5,892,582 and co-pending U.S. patent application Ser. No. 09/286,411, filed Apr. 5, 1999.

Data collected by the interrogation/detection system can be displayed in a variety of ways to provide indication of output wavelength of the light source at a given point in the wavelength sweep.

Figure 4B:
FIGS. 4B and C are schematic drawings of two wavelength reference configurations that can be used in the swept wavelength lasers of this invention.
Figure 4C:
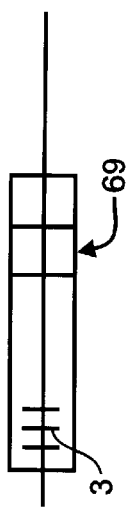

The wavelength reference (62) of FIG. 4A is illustrated in more detail in FIG. 4B as a reference FBG (3) optically coupled in series with an FFPI (7). The reference FBG can also be optically coupled in parallel to the FFPI as described in U.S. Pat. No. 5,838,437. where a number of configurations for interrogator systems are also provided. Furthermore, as illustrated in FIG. 4C, and as described in more detail in U.S. Pat. No. 5,892,582, the reference FBG can be positioned internal to or external to the FFPI. The internal FBG is positioned in fiber within the ferrule assembly of the FFPI, as illustrated in 69 of FIG. 4C.

FIG. 5 illustrates one application of the swept-wavelength laser and wavelength reference systems of this invention in a sensor interrogator system. This interrogator differs from those of FIGS. 1 and 2 in that the illuminating light source is a swept-wavelength laser 66 rather than a broad band source. Other differences become clear on review of the following FIGS. 5–7.

In the configuration illustrated in FIG. 5A, light source output is switched (using an optical switch) (72) so that it passes through a reference branch (75). After exiting the FFPI (7), light from the reference branch at c is split between a and b at coupler 79 and directed to the photodetector (76). When the optical switch is activated (72), source light enters the sensor array 78 via a and d (the coupler 79 splits light from a into c and d). Wavelengths of light reflected from the FBG's in the sensor array traverse a and b to be detected at the light detector. In one configuration, the reference branch contains an FFPI (7) which will pass a comb of wavelengths as a function of sweep voltage (i.e., sweep time) and the reference $FBG_R$ (3), within the dashed circle, which reflects a known wavelength is positioned in parallel to the FFPI (shown in the sensor array branch 78). In another embodiment, the reference $FBG_R$ 3 is positioned in series with the FFPI in the reference branch, as illustrated in FIG. 5B. The reference $FBG_R$ 3 may be positioned in either the reference or measurement branch. Light entering the FBG sensor array will be reflected if the wavelength of the entering light matches the Bragg wavelength of $FBG_R$ or the Bragg wavelength of an FBG in the sensor array. In the illustrated configuration, the two branches R 75 and M 78 can be periodically illuminated (e.g., on alternate sweeps of the laser) to collect reference wavelength of the comb and FBG reflections (reference and sensor data).

The operation of coupler 79 in the system of FIG. 5A is illustrated in the chart provided in that figure.

As known in the art and as described in U.S. Pat. No. 5,838,437, an FBG sensor array contains a plurality of FBGs positioned in the array to detect changes in the environment in contact with or affecting the FBG (e.g., temperature, stress, etc.). Environmental changes are detected if they change the wavelength peak reflected (or wavelength notch transmitted) of a given FBG sensor. The interrogator systems of this invention can be readily configured to interrogate wavelength notches transmitted through an FBG array.

The wavelength of light reflected from a sensor is calibrated using the calibrated reference comb of the $FBG_R$/FFPI combination. Reference data is collected while the light source output passes through the reference branch. Sensor data can be collected when the source light is diverted from the reference branch. For example, the reference branch can be illuminated on alternate wavelength sweeps of the laser. Zero-crossing detection methods can be used in these wavelength interrogation systems as is described in more detail in U.S. Pat. No. 5,838,437.

FIG. 6A illustrates another sensor interrogation configuration of the invention in which a portion of the output of the swept-wavelength source is passed through a reference branch (R,75) (1% being illustrated) into a photodetector 76R. The rest of the source output (99%) is introduced into the sensor array and reflected light from FBGs in the array passes through branch M 78 to a photodetector 76M. In this case, source wavelength can be calibrated on every sweep and sensor data can be collected on every sweep of the light source. The system detects the wavelengths reflected back from the array of FBG sensors and allows detection of environmental changes. The wavelength reference can be an $FBG_R$ 3 in series with an FFPI 7, as illustrated in FIG. 6B, which will pass a comb of wavelengths with a marked or identified peak. The identified peak can be the peak nearest the wavelength of the $FBG_R$ or more preferably the second peak in the comb from the wavelength of the $FBG_R$. The configuration is illustrated with two light detectors: one for each of the reference branch and the signal branch M. These detectors can be replaced with a single detector 76 and an optical switch 72 to selectively detect signal from either branch as desired, as illustrated in FIG. 6C. The amount of light initially directed into the reference branch can be varied to optimize operation of the device. In general, it is preferred to divert as little light as possible to maximize source illumination available for FBG sensor interrogation.

Figure 7:
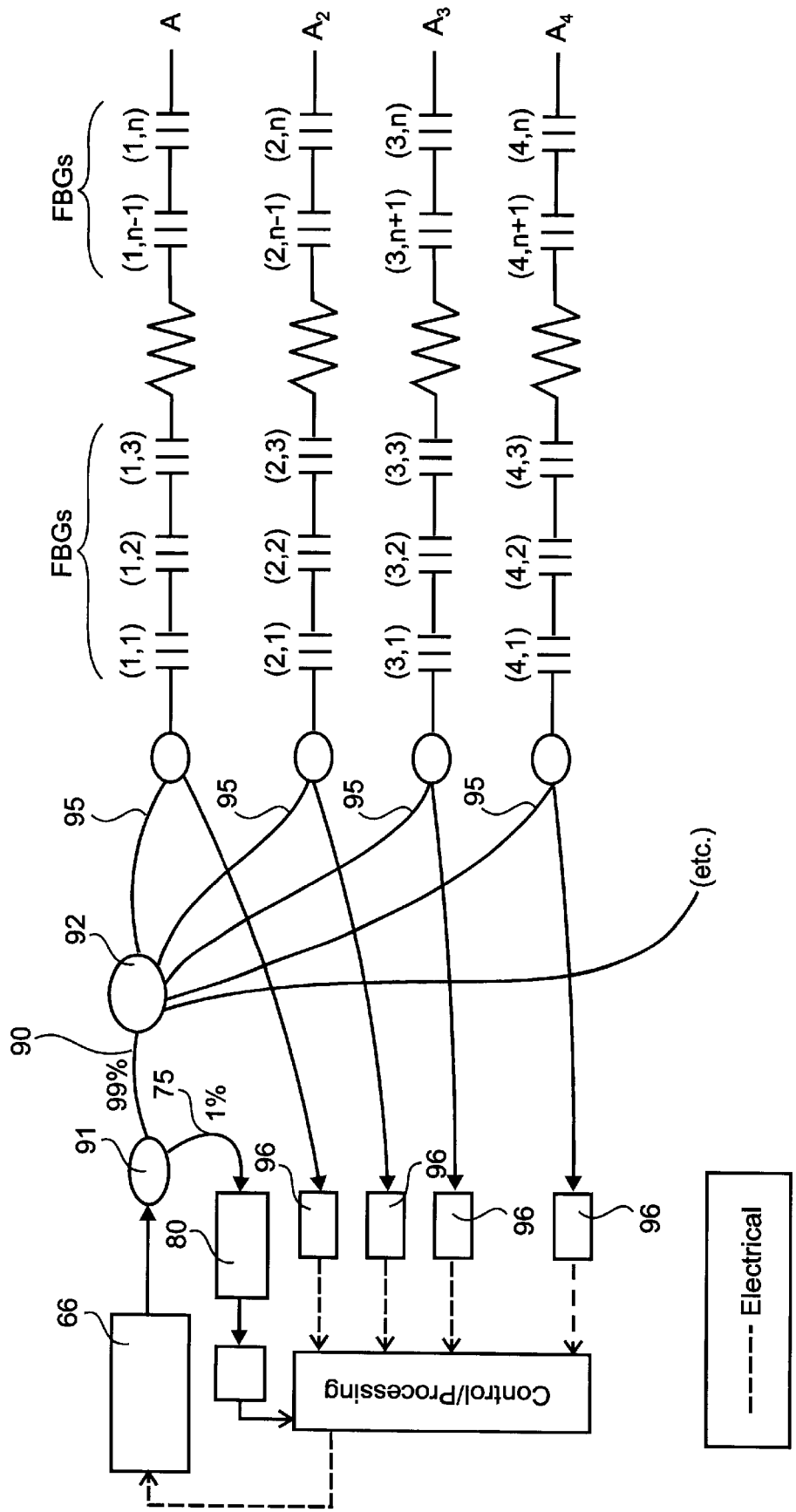
FIG. 7 is a schematic drawing of a wavelength interrogator system of this invention for an FBG array having a plurality of linear sensor arrays. Output from the laser is introduced into each sensor array and light reflected back from an array is transmitted into a separate photodetector.

FIG. 7 schematically illustrates a swept-wavelength master interrogation system. Output from the swept-wavelength laser is split 91 between a reference branch 75 (1% is illustrated) and a sensor array (99% is illustrated) 90. A 1×N (1×4, illustrated) optical splitter 92 then splits the output light among a plurality of sensor branches A1, A2, A3, A4, etc . . . (4 branched are illustrated). Each sensor branch 95 contains a plurality of FBG sensors (n FBGs are illustrated). Reflected light from each branch is simultaneously interrogated via a plurality of photodetectors (96) to determine wavelength reflected and detect any wavelength variation due to environmental changes at a given FBG in the array. On each wavelength sweep of the light source, the output is calibrated and data from the plurality of sensor branches is collected. Sensor data (sensor wavelength, change in wavelength or a property associated with a wavelength change can be rapidly gathered and displayed as a data array representing variation in a given environmental property over the area of the multiply branched sensor array. Electronic data collection, data processing and laser control are as discussed in the systems described above.

The swept-wavelength light source sensor configurations of this invention, particularly those using a swept-wavelength laser, provide high power which enables high sensitivity and high resolution detection of wavelength. The use of a high power source obviates the need for optical switching and allows very rapid space division multiplexed interrogation of large sensor arrays. The use of high power swept-wavelength light sources further allow interrogation of very large arrays having high FBG sensor counts.

The system illustrated in FIG. 7 is readily and inexpensively expandable to handle additional sensor branches simply by changing the splitter and adding an additional light detector (or decoder).

The reference system (i.e., the fixed FFP) typically produces a comb of wavelengths spaced from about 0.1–10 nm apart. Within a 50 nm (6250 GHz) spectrum there can typically be from about 5– to about 500 wavelength peaks, that have almost identical spacing. In particular embodiments, the fixed FFP is selected to provide a comb of wavelengths spaced about 1 nm apart, giving about 50 peaks within a 50 nm spectrum. The configurations and methods of this invention provide accurate identification of these peaks (wavelengths) solving the problems of calibration of sensor and interrogator systems, particularly those based on the use of FBGs. The reference FBG described in the inventive configuration is used to tag one of the peaks of the comb for positive identification eliminating the difficulty of distinguishing between the closely spaced peaks produced by the fixed FFP filter. Calibration at two wavelengths (preferably spaced apart near the extremes of the wavelength range) provides accurate calibration of the spacing of the comb generated by the fixed FFP filter.

Various alternative scanning and illumination schedule patterns (optical switching patterns between R and A branches, for example) can be employed. For example, the sensor branch can be illuminated and data collected for a plurality of scans before the system is switched to collect data from the reference branch. The reference branch may, for example, be assessed once in every two wavelength sweeps (alternately), once in every 10 wavelength sweeps, or once in every 100 wavelength sweeps. The choice of relative branch illumination and sweeping pattern is a matter of routine optimization based on the optical device elements employed and the application of the referencing system. In general, however, the referencing method employed in this invention not only stabilizes the system against thermal and mechanical drifts, but also corrects for filter and PZT non-linearities. Using the accurate interpolation methods of this invention, unknown FBG shifts can be measured to an accuracy of a few μstrain over very long time periods.

Figure 8:
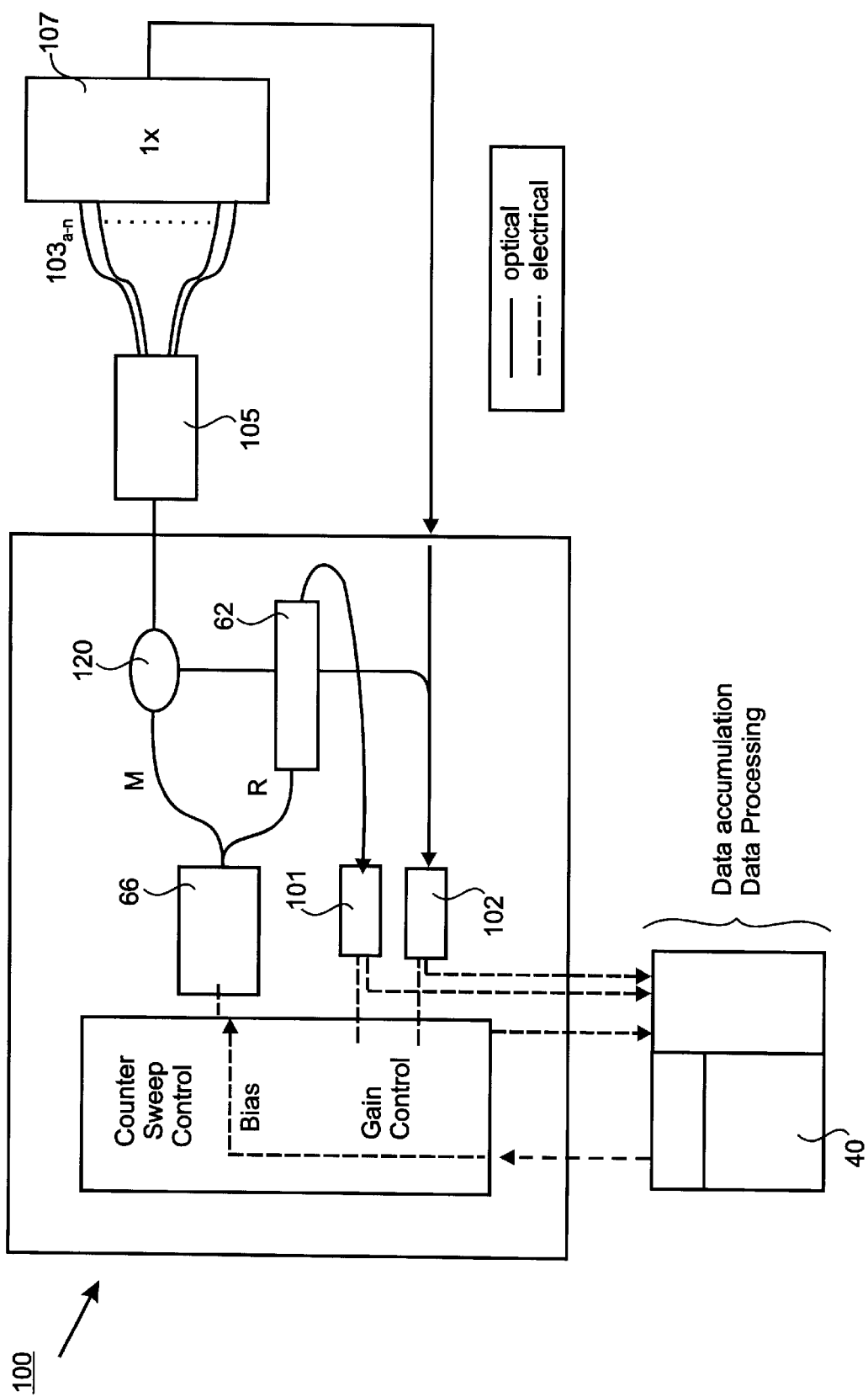
FIG. 8 is a schematic drawing of a swept wavelength laser WDM component test system. The system is illustrated for testing an AWG (array waveguide grating). The component may be placed within a thermal chamber to allow testing under thermal cycling.

The calibrated swept wavelength laser of this invention, as shown e.g. in FIG. 4A, can also be used for testing WDM components particularly for use in communication systems. Measurement methods used to characterize WDM components is generally discussed in B. Nyman (1998) Optoelectronics World supra. FIG. 8 is a schematic drawing of a WDM component testing system employing the calibrated swept wavelength laser of this invention. The testing system 100 allows assessment of wavelength accuracy and transmission loss in WDM components, such as array waveguide gratings (AWGs) 105. Output from the swept wavelength laser 66 is coupled into the component to be tested (e.g. 105, i.e. through a measurement branch M) and/or into the reference branch R comprising the wavelength reference 62. Output may be introduced into the two branches continuously using an optical splitter or may be switched between the two branches periodically using an optical switch. Output from the reference branch is optically coupled into a photodetector 101. Output from the WDM component is optically coupled back into the testing system to a photodetector 102. In some testing applications, a single photodetector and an optical switch to selectively couple output from the WDM component(s) or the reference branch into the photodetector can be used in place of multiple photodetectors. Note that the WDM component may have multiple outputs, as illustrated in FIG. 8 by the multiple channels (103a–n, where n is the maximum number of channels to be tested) of output generated by the AWG. In this case, a 1×n optical coupler (107) is employed to selectively couple the output channels back into photodetector 102. The WDM component is optionally enclosed in a thermal chamber to allow performance testing during thermal cycling, e.g., from about 0°–about 70° C. Output from the photodetectors is synchronously accumulated over the entire wavelength range as a function of counter value (n). Counter values are associated with the voltage applied to the tunable filter of the swept wavelength laser as described above. By analysis of the data accumulated from the reference output of known wavelengths, counter values are associated with wavelength. Counter values are, in turn, employed to determine the wavelengths of any peaks in the output of the test WMD. The system is provided with standard electronics and data processing to control laser sweep and the counter and accumulate amplitude data from the photodetectors as a function of counter value as well as to analyze the reference output and determine the wavelength in the test output. Standard software programs are employed in this analysis. The photodetectors can be electronically coupled into an oscilloscope (e.g., via a A/D scope card in a computer system) to allow visualization of peak amplitude as a function of count (sweep voltage). As discussed above, any shifts in the reference wavelength peaks can be detected and corrected by application of a bias voltage to the tunable filter of the swept wavelength laser.

In an alternative test system, a single photodetector combined with an optical switch can be used to periodically accumulate data from either the reference or the measurement branch (e.g., reference and measurement data can be accumulated sequentially).

Insertion loss measurements can be preformed by comparing the output power spectrum of the laser with that of the output of the WDM component. The output of the laser can be directly coupled into photodetector 102 to allow such comparison. Optionally, an optical switch (120) can be provided to allow such comparison at any time during testing.

Those of ordinary skill in the art will appreciate that the configurations illustrated herein can be adapted to a variety of systems. Configurations using various combinations of optical device elements, such as switches and couplers are readily apparent to those of ordinary skill in the art based on what has been illustrated. Optical and electrical configurations and optical device elements other than those specifically described herein and alternative methods for collecting data and making data comparisons other than those specifically described herein can be used in the systems and methods of this invention.

Optical switches include mechanical shutters, polymer switches and liquid crystal devices, such as liquid crystal shutters, for blocking a light path. Other optical switching devices useful in this invention, include those that divert light from one path to another instead of just blocking a path. A particularly interesting alternative to splitters and switches is an optical circulator which can have a plurality of ports. Light entering one port of a circulator exits by a second port, and light entering that second port exits by a third port, etc. Circulators are of particular interest for minimization of signal loss.

The specific configurations of this invention have been exemplified using lenseless FFP-TF's, such as those described in the patents cited in the Background of the Invention. Alternative tunable devices can be employed for wavelength sweeping, including without limitation: microoptic tunable filters (with lenses, such as those that are commercially available from Queensgate or JDS), acousto-optic tunable filters, tunable diffraction gratings (tunable by moving the detector or by moving the grating), and Michaelson interferometers.

FBGs and FFP filters are temperature sensitive in that their wavelengths change with temperature. It is preferred to maintain the wavelength relationship between the reference FBG and the fixed FFP filter to ensure that the correct tooth of the FFP filter comb is identified. This can be done by various methods. Both devices can be housed in a temperature controlled environment (the same or matched environments) or attached to a thermally conductive mass which ensures temperature tracking, i.e., that both are kept at substantially the same temperature. Thermoelectric devices can be used to regulate the temperatures. Various methods of temperature compensation or stabilization, such as described in the patents listed in the Background of the Invention, can also be employed. The accuracy of the FFP filter reference can be determined by temperature compensation, temperature control or by a measured calibration curve which relates wavelength and temperature. The degree of temperature control of the FBG and fixed FFP reference elements required depends on wavelength variation of the devices with temperature, generally on the application of the reference system and the desired accuracy of the calibration. If, for example, the device exhibits a variation of 10 picometers (in wavelength)/° C., then temperature must be controlled to 0.1° C. to allow measurements to 1 picometer. As an alternative, the temperatures of the FFPI and FBGR can be monitored during device operation to allow temperature effects to be considered in wavelength measurement.

Measurement accuracy can be increased by repeatedly sweeping the source output and averaging, or otherwise statistically analyzing, the measured values. It is therefore desirable to have a laser capable of sweeping wavelength at a high repetition rate for the preceding reason as well as for measuring rapidly changing wavelengths and to minimize the effects of thermal and other drifts. A significant advantage resulting from capturing and storing only the wavelength values at which peaks or valleys occur (i.e., using zero-crossing detection), is that relatively little data is required to store the results of many scans.

The specific configurations described herein have emphasized the measurement of unknown wavelengths, such as those reflected back from sensor FBGs whose Bragg wavelengths are affected by environmental changes, such as strain or temperature. The interrogations systems, employing the reference system of this invention can also be employed for identifying which of a number of known wavelengths is being generated or transmitted to the interrogator.

Those of ordinary skill in the art will appreciate that methods and materials other than those specifically disclosed herein and that are readily adaptable for use in this invention are known to those of ordinary skill in the art. All functionally equivalent methods and materials known to those of ordinary skill in the art can be apply for the practice of this invention and are within the scope of this invention.

We claim:

1. An sensor interrogator system for measuring wavelengths of radiation from an array of Fiber Bragg gratings which comprises:

a wavelength swept fiber laser comprising a tunable filter;

a photodetector;

a reference optical branch comprising a fixed FFPI filter for selectively optically coupling the output of the wavelength swept laser through the fixed FFP to the photodetector;

a measurement optical branch for selectively coupling the output of the wavelength swept laser to the Fiber Bragg grating array and for coupling reflection from the Fiber Bragg grating array to the photodetector;

one or more reference FBGs optically coupled in one of said measurement branch or said reference branch;

an optical switch for selectively coupling the output of the wavelength swept laser to the reference optical branch or to the measurement optical branch;

a differentiator electrically coupled to the photodetector;

a zero crossing detector electrically coupled to the differentiator;

a data latch electrically coupled to the zero crossing detector;

an actuator mechanically coupled to the tunable filter in said swept wavelength laser;

a sweep generator electrically coupled to the actuator; and a counter electrically coupled to the data latch and to the sweep generator wherein the actuator under the control of the sweep generator tunes the tunable filter.

2. The sensor interrogator system of claim 1 wherein the swept wavelength fiber laser further comprises a pump laser, a WDM and a selected length of active fiber wherein the pump laser is optically coupled to the WDM which is in turn optically coupled to the length of active fiber which is in turn optically coupled to the tunable filter and wherein the output of the tunable filter provides the output of the swept wavelength laser.

3. The sensor interrogator system of claim 1 wherein the tunable filter is a tunable all-fiber Fabry Perot filter.

4. The sensor interrogator system of claim 1 wherein the reference FBG is in the reference optical branch optically coupled in series with the FFPI.

5. The sensor interrogator system of claim 1 wherein the reference FBG is in the measurement branch optically coupled in parallel with the FFPI.

6. The sensor interrogator system of claim 1 wherein the output of the wavelength swept laser is continuously optically coupled to reference branch through an optical splitter and continuously coupled to the measurement branch through an optical circulator.

7. The sensor interrogator system of claim 6 which comprises a photodetector for each of the reference branch and the measurement branch.

8. The sensor interrogator system of claim 1 wherein the output of the wavelength swept laser can be optically coupled to a plurality of linear arrays of FBGs.

9. The sensor interrogator of claim 8 which comprises a photodetector for each linear array of FBGs.

10. A sensor system comprising the sensor interrogator of claim 1.

11. A method for determining the wavelengths reflected from an FBG sensor array which comprises the steps of:

providing a sensor interrogator system of claim 1;

accumulating reference and test data from the optical output of the wavelength reference and the sensor array, as a function of the count of the electronic counter;

determining the counter value(s) associated with one or more known wavelengths in the optical output of the wavelength reference;

associating one or more counter values with amplitude peaks in the optical output of the sensor array and thereby determining the wavelength(s) in the optical output of sensor array.

12. A calibrated wavelength swept fiber laser which comprises a wavelength swept fiber laser and a reference optical branch comprising an FFPI and a reference FBG for calibrating the output of the laser.

13. The calibrated wavelength swept laser of claim 12 wherein a portion of the output of the wavelength swept laser is optically coupled into the reference branch using an optical splitter.

14. The calibrated wavelength swept laser of claim 12 further comprising a photodetector optically coupled to the reference branch:

a differentiator electrically coupled to the photodetector;

a zero crossing detector electrically coupled to the differentiator;

a data latch electrically coupled to the zero crossing detector;

an actuator mechanically coupled to the tunable filter in said swept wavelength laser;

a sweep generator electrically coupled to the actuator; and a counter electrically coupled to the data latch and to the sweep generator wherein the actuator under the control of the sweep generator tunes the tunable filter of the wavelength swept laser.

15. The calibrated wavelength swept laser of claim 12 further comprising a pump laser, a WDM and a selected length of active fiber wherein the pump laser is optically coupled to the WDM which is in turn optically coupled to the length of active fiber which is in turn optically coupled to the tunable filter and wherein the output of the tunable filter provides the output of the swept wavelength laser.

16. The calibrated swept wavelength laser of claim 12 wherein the tunable filter is a tunable all-fiber Fabry Perot filter.

17. A WDM component testing system which comprises:

a calibrated swept wavelength laser comprising a wavelength reference, a tunable filter which is tunable by application of a voltage ramp controlled through an electronic counter and a reference photodetector for receiving output from the wavelength reference wherein a portion of the output of the laser can be optically coupled into a WDM component to be tested; and a measurement photodetector for receiving optical output from the WDM component to be tested wherein amplitude data from the photodetectors is accumulated as a function of the count of the electronic counter and the data accumulated from the wavelength reference is used to determine the wavelengths in the optical output of the WDM component.

18. The WDM component testing system of claim 16 wherein the WDM device is an AWG.

19. The WDM component testing system of claim 16 wherein the output of the laser first is directly coupled into the measurement photodetector and laser output reference data is accumulated as a function of counter value and thereafter the laser output is coupled into the WDM component and to the measurement photodectector to accumulate test data and wherein the laser output reference data is compared to the test data to measure insertion loss in the WDM component.

20. A method for testing the performance of a WDM component which comprises the steps of:

providing WDM component testing system of claim 17;

synchronously accumulating reference and test data from the optical output of the wavelength reference and the WDM component, respectively, as a function of the count of the electronic counter;

determining the counter value(s) associated with one or more known wavelengths in the optical output of the wavelength reference; associating one or more counter values with amplitude peaks in the optical output of the WDM component and thereby determining the wavelength(s) in the optical output of the WDM component.

* * * * *